United States Patent [19]

Wymann et al.

[11] Patent Number: 4,716,066
[45] Date of Patent: Dec. 29, 1987

[54] FILLING BODY OF ACID-RESISTANT SYNTHETIC PLASTICS MATERIAL

[75] Inventors: Paul Wymann, Basel; Volker Fattinger, Arlesheim, both of Switzerland

[73] Assignee: Wam-Plast AG, Basel, Switzerland

[21] Appl. No.: 848,052

[22] Filed: Apr. 4, 1986

[30] Foreign Application Priority Data

Apr. 16, 1985 [CH] Switzerland ............ 1608/85

[51] Int. Cl.$^4$ ................................. B32B 3/12
[52] U.S. Cl. ..................... 428/116; D9/456; 261/94; 261/DIG. 72
[58] Field of Search ............ D9/456; 206/521, 524.5; 261/94, DIG. 72; 428/131–116

[56] References Cited

U.S. PATENT DOCUMENTS

| 3,506,248 | 4/1970 | Starbuck et al. | 261/94 |
| 3,957,931 | 5/1976 | Ellis et al. | 261/DIG. 72 |
| 4,072,736 | 2/1978 | Fattinger | 261/DIG. 72 |
| 4,115,269 | 9/1978 | Bennett et al. | 261/94 X |
| 4,122,011 | 10/1978 | Strigle, Jr. | 261/94 X |
| 4,148,868 | 4/1979 | Fattinger | 423/523 |
| 4,195,043 | 3/1980 | Foote et al. | 261/DIG. 72 |
| 4,242,321 | 12/1980 | Fattinger | 423/523 |
| 4,385,988 | 5/1983 | Hypponen | 261/DIG. 72 |
| 4,511,519 | 4/1985 | Hsia | 261/DIG. 72 |
| 4,522,767 | 6/1985 | Billet et al. | 261/DIG. 72 |

FOREIGN PATENT DOCUMENTS 2093728 2/1982 European Pat. Off. .
2738362 1/1979 Fed. Rep. of Germany .

Primary Examiner—Henry F. Epstein
Attorney, Agent, or Firm—Burns, Doane, Swecker & Mathis

[57] ABSTRACT

A filling or packing body has an annular cell structure. All walls surrounding each cell are normal to the main plane along which the annular structure extends. Dividing walls between the cells transverse to an outer wall closed upon itself are parallel with each other at least for a row of adjacent cells or for all of them. The ring constituted by the row of cells having the outer wall in common can be of round, in particular of circular or elliptic configuration, or its configuration can be polygonal, especially triangular. The height of the cell walls, normal to the main plane, can be constant or it can be higher at the center than at the periphery of the ring structure.

30 Claims, 9 Drawing Figures

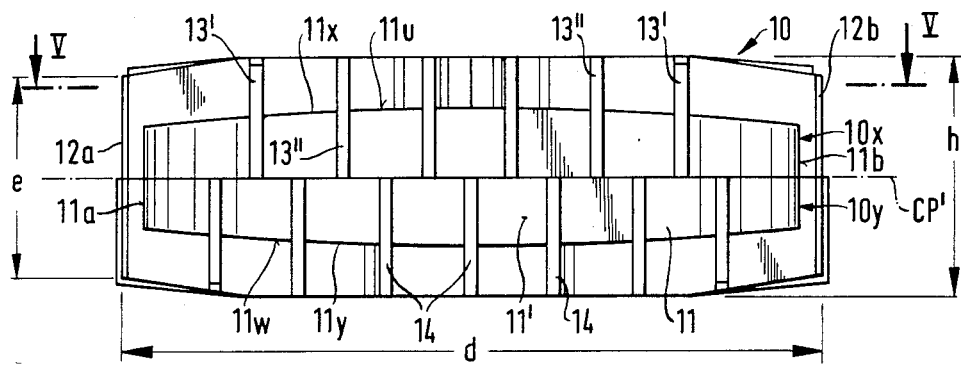
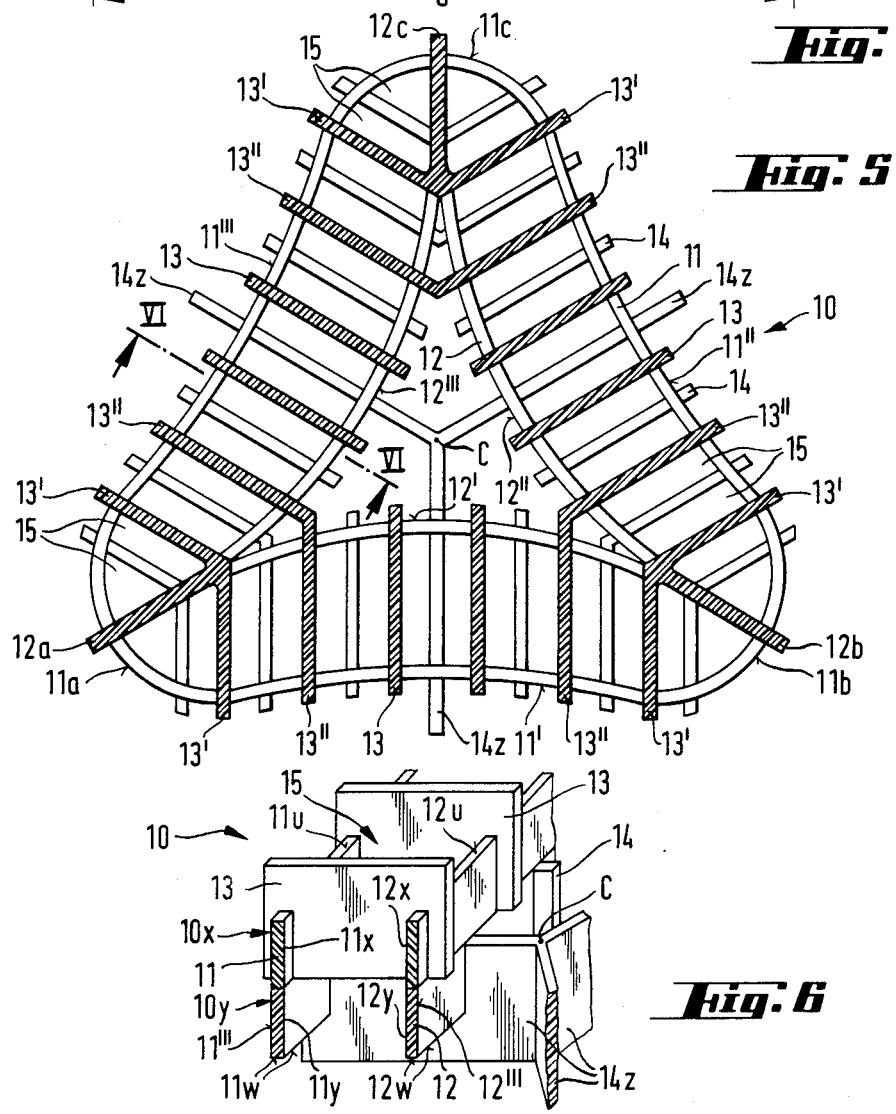

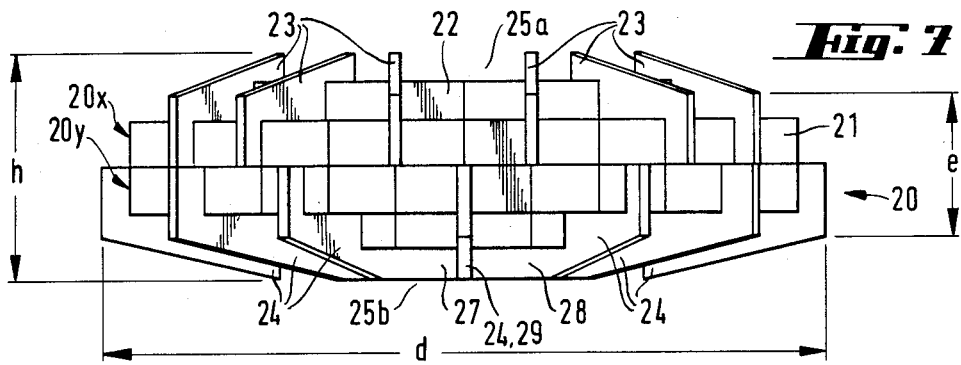
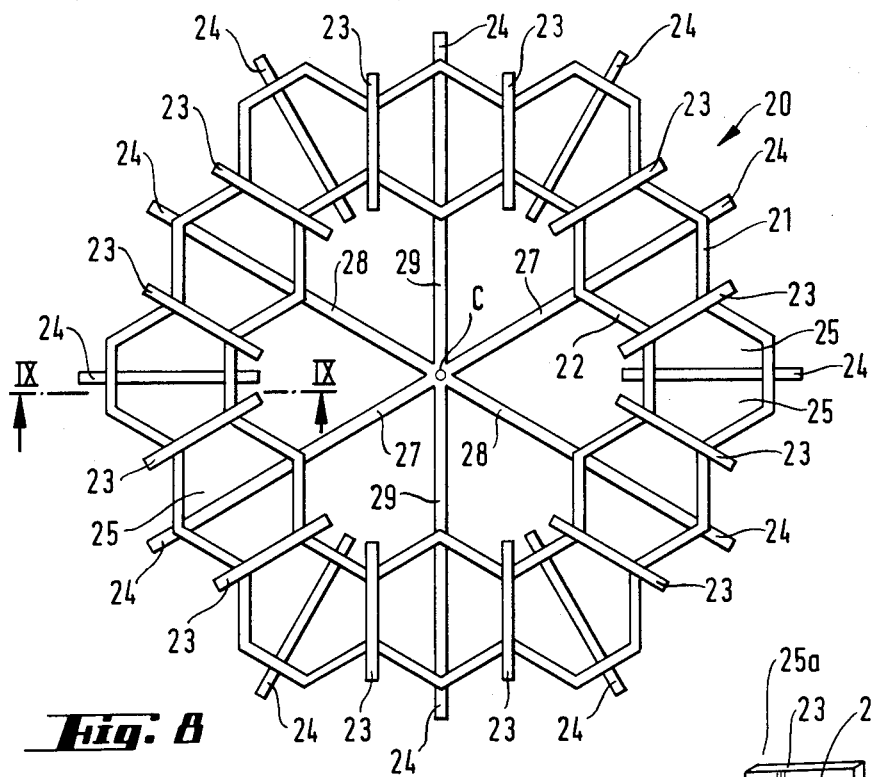
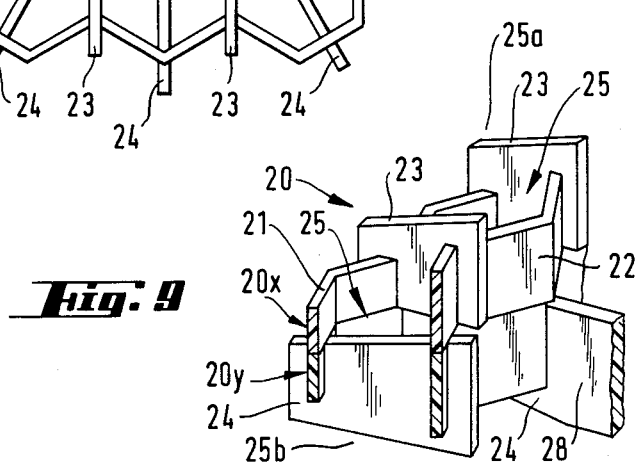

FILLING BODY OF ACID-RESISTANT SYNTHETIC PLASTICS MATERIAL

BACKGROUND OF THE INVENTION

This invention relates to a filling or packing body of acid-resistant synthetic plastics material, a plurality of which, heaped up in an irregular manner, will constitute, per cubic meter (m$^3$) of bulk volume, a total surface, of all bodies therein, of more than 250 m$^2$.

Filling bodies of many different shapes are known which are used for improving the exchange of material between streams of gas and liquids. Widely used are, for instance, ring-shaped elements known as Raschig rings, Pall rings, Berl saddles, flat triangular elements and other types.

Among the techniques of chemical processing, there are many involving the use of filling bodies having a large surface. Where total surfaces of filling bodies of more than 250 m$^2$ per m$^3$ of gas-liquid contact space are required, the number of such bodies is generally above 50,000 per m$^3$, resulting in correspondingly high production costs. When producing filling bodies from metal, it is possible to use very thin metal sheets, affording a free volume of more than 94% calculated on the total volume occupied by such body. However, filling bodies made from acid-resistant metals are very expensive, especially where large surfaces and correspondingly large numbers of bodies per unit of volume are required.

Gas purification methods are known which require the use of filling bodies in layers having a total height of 5 meters, and in which the filling bodies must be of ceramic or of synthetic plastics material. Such methods involve, for instance, the purification of nitrogen oxides with sulfuric acid, and are described in Ullmanns Enzyklopädie der technischen Chemie, 4th revised and enlarged edition, published by Verlag Chemie, Weinheim, Germany, Vol. 21 (1982), page 148; and U.S. Pat. Nos. 4,148,868 (1979) and 4,242,321 (1980), both assigned to Ciba-Geigy Corporation, Ardsley, N.Y.

The lower portion of the heaped-up layer of filling bodies is subject to a relatively high pressure resulting from the weight of the superimposed filling bodies and in addition, from the weight of the sprayed-on or sprinkled-on acid. Reasonably inexpensive acid-resistant synthetic resin materials, such as polyethylene, are already relatively soft when they are to be used for the manufacture of thin-walled filling bodies.

In the denitration zone of a nitrogen oxides/sulfuric acid system, temperatures of up to 120° C. may prevail. While filling bodies of fluoro hydrocarbons such as polyvinylidenefluoride (PVDF) are chemically resistant, they can only be applied at reasonable cost when it is possible to produce them from extremely thin-walled material.

OBJECTS AND SUMMARY OF THE INVENTION

In view of these facts it is a principal object of the invention to provide a filling body of the initially described type of acid-resistant material, a layer of which has the above-described total surface of more than 250 m$^2$ per m$^3$ of irregularly heaped-up bodies.

This object and others, which will become apparent from the following description of the invention, are attained, in accordance with the invention, in an above-described filling body, more than 80% of the surface of which comprises walls the thickness of which corresponds to the thickness of the synthetic sheet material and which are so arranged relative to each other that they extend, in at least one direction of viewing, i.e. on a plane normal thereto, are straight or curved, that the outer wall of the filling body which is subject to pressure when in the heaped-up layer, is of cellular construction, being built up from cells which are open for the passage of gas therethrough along ducts, and all sidewalls of which, transverse to the said outer wall, have central planes extending therethrough on a plane normal to said central planes, being curved or preferably straight and of a thickness corresponding to that of the synthetic sheet material. Furthermore, the filling bodies of triangular, square or other polygonal, or of circular, ellipsoid or other round configurations which are exposed to pressure inside the heaped-up filling body layer, must have a wall built up by a series of cells in a manner such that the axes of the ducts, forming gas passages through the cells open at both ends, must be parallel with the cutting lines of the sidewalls of the cells, with an outer wall of the filling body.

The thickness of at least a part of the cell walls or all of them is preferably smaller than 0.8 mm, or, more advantageously, smaller than 0.5 mm, and in special cases even smaller than 0.3 mm.

BRIEF DESCRIPTION OF THE DRAWINGS

Further objects and advantages of the invention will become apparent from the following more detailed description thereof in connection with the accompanying drawings in which

FIG. 4 is a sideview of another, preferred embodiment of the filling body according to the invention;

FIG. 5 is a cross-sectional view of the preferred embodiment shown in FIG. 4, taken in a plane indicated by V—V therein;

FIG. 6 is a partial axial-sectional view of the same preferred embodiment as shown in FIGS. 4 and 5, taken in a plane indicated by VI'VI in FIG. 5;

FIG. 7 is a sideview of a third embodiment of the filling body according to the invention;

FIG. 8 is a top view of the same embodiment as shown in FIG. 7; and

FIG. 9 is a partial axial-sectional, schematical view of the said third embodiment taken in a plane indicated by IX—IX in FIG. 8.

DETAILED DESCRIPTION OF THE EMBODIMENTS SHOWN IN THE DRAWINGS

Figure 1:
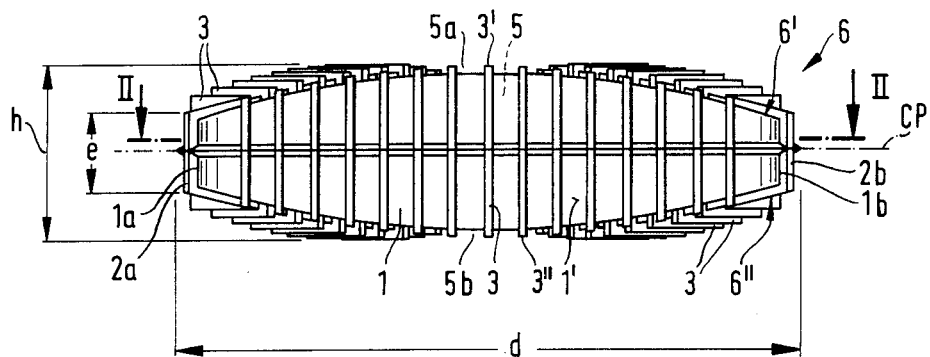
FIG. 1 is a sideview of a first embodiment of the filling body according to the invention.
Figure 2:
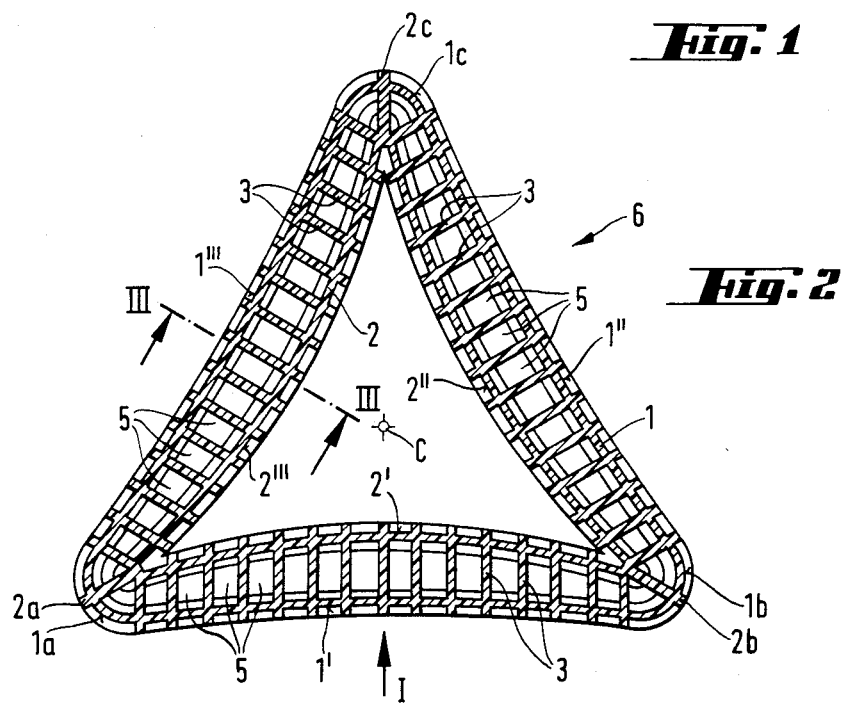
FIG. 2 is a cross-sectional view, of the same embodiment, taken in a plane indicated by II—II in FIG. 1.
Figure 3:
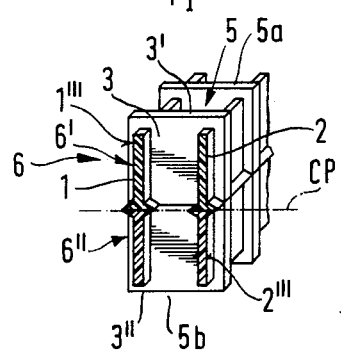
FIG. 3 is a partial axial-sectional view of this embodiment taken in a plane indicated by III—III in FIG. 2.

The embodiment of a filling body according to the invention shown in FIGS. 1 to 3 comprises an outer circumferential wall 1 closed upon itself and having a cross-sectional contour of generally triangular configuration, with three corner regions 1a, 1b and 1c; the sidewall sections 1', 1" and 1''' of the outer wall between these corners are slightly concavely curved, relative to the outside.

The interior of the triangle comprises an inner wall 2 constituted by three inner wall sections 2', 2" and 2"' the end zones of which are welded together in terminal portions 2a, 2b and 2c protruding slightly from the corner regions 1a, 1b and 1c, respectively.

The inner wall sections 2', 2" and 2"', are each also of concave configuration, the curvatures of which are slightly greater than those of the sidewall zones of outer wall 1.

In the embodiment of FIGS. 1 to 3 the height of the walls 1 and 2 is greatest at the center of each sidewall section between corners 1a, 1b and 1c and smallest at these corners, as illustrated in FIG. 1.

The outer wall sections 1', 1" and 1"' are connected with the neighboring inner wall sections 2', 2" and 2"', respectively, by transverse dividing walls 3 which subdivide each interspace between sections 1' and 2', between 1" and 2", and between 1"' and 2"', respectively, into cells 5 which are open at the bottom 5b and at the top side 5a of the filling body 6.

The resulting filling body 6 can be manufactured, for instance, from the above-mentioned plastics material in two halves 6' and 6" which can be superimposed so that the dividing half walls 3' in the upper half 6' register with the corresponding half walls 3" in the lower half 6" to constitute composite dividing walls 3.

The upper half 6' and the lower half 6" can be glued or welded together in a common central plane CP wherever their walls 1, 2 and 3 are superimposed to contact or cross each other.

In the second preferred embodiment shown in FIGS. 4 to 6 the outer endless wall 11 of the filling body 10 extends in somewhat triangular configuration between convexly rounded corner regions 11a, 11b and 11c, and the inner wall 12 is composed of inwardly, i.e. concavely curved wall sections 12', 12" and 12"', which are joined together at their end portions 12a, 12b and 12c. These end portions intersect the endless wall 11 at the corner regions of the latter.

The filling body 10 is preferably composed of an upper half 10x and a lower half 10y which can be welded together in a joint plane CP', in which the upper outer and inner half walls 11x and 12x of walls 11 and 12 are superimposed on the lower outer and inner half walls 11y and 12y, respectively.

In the upper half 10x of the filling body 10, the interspace between each section of the outer and inner walls, for instance, between 11' and 12', or between 11" and 12", or between 11"' and 12"', is subdivided into a plurality of cells 15 by transverse dividing walls 13 which end downwardly at the joint plane CP' flush with the lower rims of the upper halves 11x and 12x, respectively, of the outer wall 11 and the inner wall 12. Upwardly they extend well above the upper rims 11u and 12u of the upper half walls 11x and 12x, respectively. (See FIG. 6).

In order to stabilize the fundamentally triangular configuration of the filling body 10, the nearest and the next adjacent dividing walls 13' and 13", respectively, are angular pieces across the two interspaces adjacent one of the body corners 10a, 10b and 10c, while the intermediate dividing walls 13 across each interspace can be only of sufficient length to bridge that interspace and not the central interior space and another interspace of the upper body half 10x.

Similarly, in the lower body half 10y of the filling body 10, the interspace between each section of the outer and inner walls, in the aforesaid regions 11', 12', or 11"', 12", or 11"', 12"' is subdivided into a plurality of cells by transverse dividing walls 14 which end upwardly at the joint plane C' between the upper and lower body halves 10x and 10y, flush with the upper rims of the lower halves 11y and 12y, respectively, of the outer wall 11 and the inner wall 12. Downwardly, the transverse walls 14 extend well below the lower rims 11w and 12w of the lower wall halves 11y and 12y, respectively (see FIG. 6).

The dividing walls 13, in the upper body half 10x, and 14, in the lower body half 10y, do not register with each other as do the dividing wall halves 3' and 3" in the preceding embodiment. Rather, the dividing walls 13 are displaced relative to the dividing walls 14, so as to be in staggered relationship to the latter.

In the embodiment shown in FIGS. 4 to 6, there are, for instance, provided in each section between wall corners 11a and 11b, or 11b and 11c, or 11a and 11c, six dividing walls 13 in the upper body half 10x and seven dividing walls 14 in the lower half 10y, each dividing wall 13 extending across the interspace between the respective sections of the outer wall 11 and inner wall 12 in a zone parallel with and intermediate two adjacent ones of the dividing walls 14 therebeneath.

In order to stabilize the configuration of the filling body the dividing walls 14 nearest a corner 11a, 11b and 11c, and next adjacent to that nearest dividing wall are angular pieces traversing the two interspaces next to each other at that respective body corner.

Moreover the dividing walls 14 traversing the centers of the sections 11', 11" and 11"' of the outer wall 11 and the corresponding sections of the inner wall 12 are joined together at the center C of the filling body to constitute and integral three-flanged dividing wall 14z.

In the internal space of the filling body 10 or 20 (infra) there can also be provided further stiffening walls or stays (not shown) which can extend in planes axially or radially with regard to the central axis through the center C of the filling body and normal to the plane in which the cross-sectional views of FIGS. 2 and 5 extend. Such stiffening walls also increase the total surface of the filling bodies in a desirable manner but must not complicate their manufacture.

It will be readily understood that in lieu of the general triangular configuration of the embodiments shown in FIGS. 2 and 5, this configuration can also be a circular, or another annular, e.g. an elliptic one, or it can be square, pentagonal etc. For instance, in the following embodiment illustrated in FIGS. 7 to 9, this configuration is hexagonal.

Yet another embodiment of a filling body according to the invention is shown in FIGS. 7, 8 and 9. In this embodiment, the filling body 20 of generally hexagonal configuration is produced with an outer sidewall 21, an inner wall 22 and transverse dividing walls 23 and 24 in the upper body half 20x and the lower body half 20y, respectively, which transverse walls 23 and 24 subdivide the annular interspace between the outer wall 21 and the inner wall 22 into cells 25 which are open at the top end 25a and at the bottom end 25b of the filling body 20.

In this embodiment the endless outer wall 21 is less high than the inner wall 22 (FIG. 9).

In order to reinforce this filling body, transverse walls 27, 28 and 29 extend to the center C of the body and are joined there rigidly together to form a six-flanged integral dividing element.

It is easier to manufacture the filling bodies according to the invention in two halves, although the embodiment of FIGS. 1 to 3 could also be manufactured in a single piece.

Advantageously, the filling bodies according to the invention are designed as relatively flat bodies the height h of which is smaller than their diameter d. Better resistance against breaking off of corners under pressure is also ensured by providing a greater height h of the body in its central region than at its periphery (height e).

The larger the number of cells between the outer and inner circumferential walls closed upon themselves, the larger will be the total surface of the filling body. Thus it has been found advantageous to provide at least eight or nine cells subdividing each interspace between a section of the outer and inner walls of a filling body of triangular configuration, i.e. a total of 24 to 27 cells surrounding the central interior space of the body. A minimum of 15 or better still, 21 cells is recommended, regardless of the configuration of the outer wall.

We claim:

1. A triangular filling body including three wall sections having inner and outer walls of acid-resistant synthetic plastic material, a plurality of which bodies, heaped-up in an irregular manner, have, per cubic meter of bulk volume, a total source area of more than 250 m², said filling body having a central axis, and more than 80% of the surface of said filling body being present on walls, the thickness of which corresponds to the thickness of sheets of the synthetic plastic material from which they are made, said outer walls defining an outside of said body, said inner and outer walls being concavely curved relative to said outside of said body, said outer walls forming an enclosure and being destined to be subject to pressure from superimposed filling bodies in a heaped-up bulk, said three wall sections being constituted by a row of cells having parallel walls and are open to the passage of gas therethrough along the axes of said cells, the number of cells in each of said wall sections being greater than three.

2. The filling body of claim 1, wherein said body is formed of two-half portions joined together.

3. The filling body of claim 1, wherein said cells walls of each half portion are aligned.

4. The filling body of claim 2, wherein said cell walls of each half portion are offset.

5. The filling body of claim 2, wherein said wall sections define three corners having a generally convex curvature relative to said outside of said body.

6. The filling body of claim 1, wherein said wall sections define three corners and said inner and outer walls having a first height at said corners and a second height between said corners, said second height being greater than said first height.

7. The filling body of claim 2, wherein said parallel walls further comprise additional walls other than said inner and outer walls.

8. The filling body of claim 2, wherein said parallel walls of each half portion are aligned.

9. The filling body of claim 2, wherein said parallel walls of each half portion are offset.

10. The filling body of claim 6, wherein said corners include a generally convex curvature relative to the outside of said body.

11. The filling body of claim 1, wherein said outer walls have a first curvature and said inner walls have a second curvature different from said first curvature.

12. The filling body of claim 6, wherein said wall sections are welded together at said corners.

13. The filling body of claim 1, wherein at least a portion of said walls has a thickness smaller than 0.8 mm.

14. The filling filling body of claim 1, wherein at least a portion of said walls has a thickness smaller than 0.5 mm.

15. The filling body of cliam 1, wherein at least a portion of sid walls has a thickness smaller than 0.3 mm.

16. The filling body of claim 1, wherein said outer walls comprise an endless wall.

17. The filling body of claim 1, wherein ones of said parallel walls of one wall section are interconnected with ones of said parallel walls of an adjacent all section.

18. The filling body of claim 1, wherein he number of cells in each of said wall sections is greater than 8.

19. The filling body of claim 1, wherein the number of cells in each of said wall sections is greter than 15.

20. The filling body of claim 1, wherein the number of cells in each of said wall sections is greater than 21.

21. A filling body comprising:
    interconnected wall sections generally forming a triangular filling body, each wall section including inner and outer wall portions, said inner wall portion defining an inside of said body and said outer wall portion defining an outside of said body, said inner and outer wall portions having a generally concave curvature relative to said outside of said body; and
    each wall section including a plurality of substantially parallel transverse dividing walls extending between said inner and outer wall portions and defining cells within said section, said cells having open opposite ends.

22. The body of claim 21, wherein said body is formed in two-half portions joined together.

23. The body of claim 21, wherein said wall sections define three corners and said inner and outer wall portions have a first height at said corners and a second height between said corners, said second height being greater than said first height.

24. The body of claim 22, wherein said dividing walls of each half portion are aligned.

25. The body of claim 22, wherin said dividing walls of each half portion are offset.

26. The body of claim 23, wherein said corners include a generally convex curvature relative to the outside of said body.

27. The body of claim 21, wherein said outer wall portion has a first curvature and said inner wall portion has a second curvature different from said first curvature.

28. The body of claim 23, wherein said wall sections are welded together at said corners.

29. The body of claim 21, wherein said outer wall portion is an endless wall.

30. The body of claim 21, wherein ones of said dividing walls of one wall section are interconnected with ones of said dividing walls of an adjacent wall section.

* * * * *